United States Patent
Zelazo et al.

(10) Patent No.: US 7,890,335 B2
(45) Date of Patent: Feb. 15, 2011

(54) SHARING WAVELET DOMAIN COMPONENTS AMONG ENCODED SIGNALS

(75) Inventors: Daniel L. Zelazo, Kasiwa (JP); Steven D. Trautmann, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1729 days.

(21) Appl. No.: 10/269,894

(22) Filed: Oct. 10, 2002

(65) Prior Publication Data

US 2004/0071300 A1 Apr. 15, 2004

(51) Int. Cl.
*G10L 19/00* (2006.01)

(52) U.S. Cl. .......................... 704/500; 700/94

(58) Field of Classification Search ............. 381/106, 381/22, 23; 700/94; 704/222, 500, 230, 704/229; 375/240.15, 240.22, 240.19, 240.21; 382/240, 253; 384/398.1, 402.1, 413.1, 416.1, 384/427.1; 345/240.19, 240.22; 708/317; 348/398.1, 402.1, 413.1, 416.1, 427.1

See application file for complete search history.

(56) References Cited

U.S. PATENT DOCUMENTS

| | | | | |
|---|---|---|---|---|
| 5,845,243 A | * | 12/1998 | Smart et al. | 704/200.1 |
| 2002/0150281 A1 | * | 10/2002 | Cho | 382/117 |
| 2003/0123743 A1 | * | 7/2003 | Zandi et al. | 382/240 |

OTHER PUBLICATIONS

Alfred Mertins, *Boundary Filters for Size-Limited Paraunitary Filter Banks with Maximum Coding Gain and Ideal DC Behavior*, pp. 183-188, Feb. 2001, IEEE Transactions on Circuits and Systems-II: Analog and Digital Signal Processing.

Alfred Mertins & King N. Ngan, *Optimized Shape Adaptive Wavelets with Reduced Computational Cost*, pp. 616-620, Nov. 1998, Proc. ISPACS 1998, Melbourne, VIC, Australia.

Alfred Matins, *Time-Varying and Support Preservative Filter Banks: Design of Optimal Transition and Boundary Filters Via SVD*, pp. 1316-1319, May 1995, Proc. ICASSP'95, Detroit, USA.

Alfred Mertins, *Optimized Biorthogonal Shape Adaptive Wavelets*, pp. 673-677, Oct. 1998, Proc. ICIP'98, Chicago, USA.

(Continued)

*Primary Examiner*—Vivian Chin
*Assistant Examiner*—Lun-See Lao
(74) *Attorney, Agent, or Firm*—Robert D. Marshall, Jr.; W. James Brady; Frederick J. Telecky, Jr.

(57) ABSTRACT

A system for sharing wavelet domain components among encoded signals receives a set of signals decomposed and encoded according to a wavelet transform. The decomposed and encoded signals each include a set of wavelet coefficients at each level of the decomposition of the encoded signal. Using a vector quantization technique, the system identifies one or more sets of wavelet coefficients that are sharable among two or more of the decomposed and encoded signals at a particular level of decomposition. The system then stores the sets of wavelet coefficients of the decomposed and encoded signals. Each identified sharable set of wavelet coefficients at a particular level of decomposition is stored only once and shared by two or more of the decomposed and encoded signals.

10 Claims, 9 Drawing Sheets

OTHER PUBLICATIONS

Robert Bristow-Johnson, *Wavetable Synthesis 101, A Fundamental Perspective*, pp. 1-23, Nov. 1996, http://www.harmony-central.com/Synth/Articles/Wavetable_101/Wavetable-101.pdf.

Ahmed H. Tewfik & Murtaza Ali, *Enhanced Wavelet Based Audio Coder*, pp. 1-5, 1993, http://citeseer.nj.nec.com/cache/papers/cs/2258/ftp:zSzzSzftp.ee.umn.eduzSzpubzSztewfikzSz1993zSzaudiozSzaudio_asilomar93.pdf/tewfik93enhanced.pdf.

N. Ruiz Reyes et al., *A New Cost Function to Select the Wavelet Decomposition for Audio Compression*, pp. 1-4, Jun. 15, 2000, http://www.es.isy.liu.se/norsig2000/publ/page331_id089.pdf.

Fernando Mujica et al., *A Simple Wavelet Based Perceptual Audio Coder*, pp. 1933-1937, 1996, http://www.icspat.com/papers/481mfi.pdf.

James D. Johnston, *Estimation of Perceptual Entropy Using Noise Masking Criteria*, pp. 2524-2527, 1988 Proc. ICASSP 1988.

Pramila Srinivasan & Leah H. Jamieson, *High Quality Audio Compression Using an Adaptive Wavelet Packet Decomposition and Psychoacoustic Modelling*, pp. 100-108, 1999, IEEE Transactions on Signal Processing.

Ted Painter & Andreas Spanias et al., *Perceptual Coding of Digital Audio*, pp. 1-66, Apr. 2000, http://www.eas.asu.edu/~spanias/papers/paper-audio-tedspanias-00.pdf.

Cormac Herley, *Boundary Filters for Finite-Length Signals and Time-Varying Filter Banks*, pp. 1-35, Mar. 24, 1994, IEEE Transactions on Circuits and Systems II.

Cormac Herley et al., *Tilings of the Time-Frequency Plane: Construction of Arbitrary Orthogonal Bases and Fast Tiling Algorithms*, pp. 3341-3359, Dec. 1993, IEEE Transactions on Signal Processing.

Joao Silvestre & Luis de Sa, *Signal Extensions in Perfect Reconstruction Filter Banks*, Nov. 19, 1999, http://www.it.uc.pt/si/sipub/js96cp01.pdf.

Alfred Mertins, *Boundary Filters for Segmentation-Based Subband Coding*, pp. 151-154, Aug. 2000, 5th International Conference on Signal Processing Proceedings.

\* cited by examiner

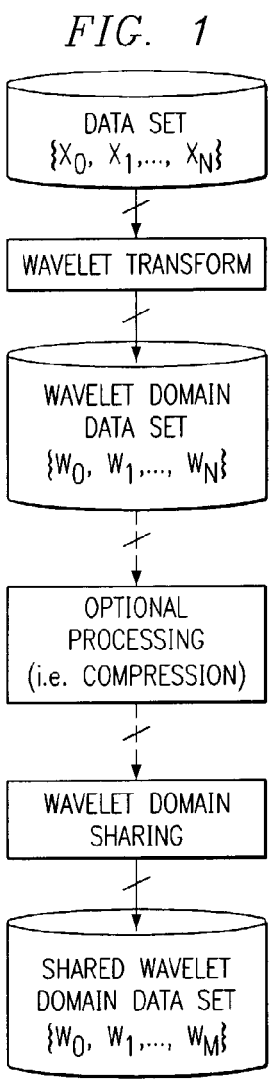
FIG. 1
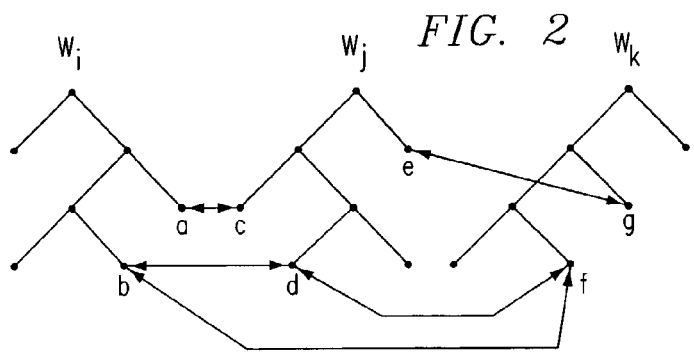
FIG. 2
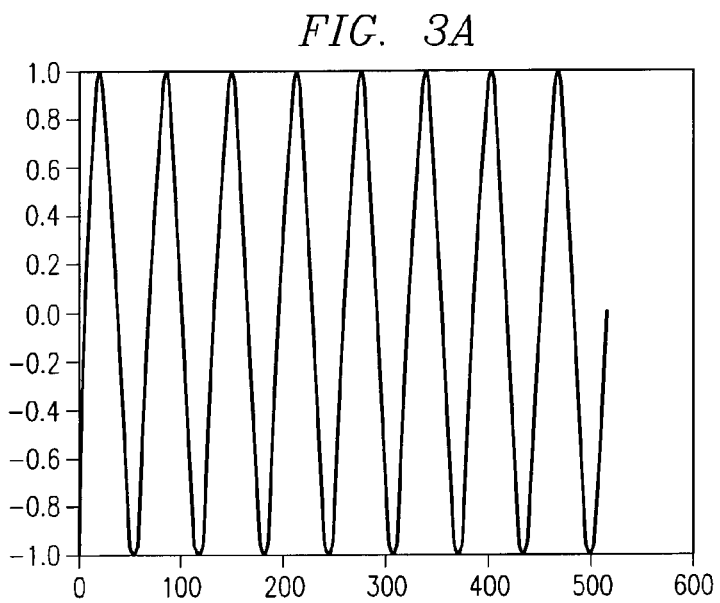
FIG. 3A
FIG. 3B

FIG. 9

| NORMS | LEVEL 0 | LEVEL 1 | LEVEL 2 | LEVEL 3 | LEVEL 4 | LEVEL 5 | LEVEL 7 | LEVEL 8 |
|---|---|---|---|---|---|---|---|---|
| X | 1.4774 | 1.9795 | 5.5577 | 15.1402 | 2.6014 | 0.4995 | 0.1281 | 0.0606 |
| Y | 2.8618 | 2.2073 | 7.6254 | 15.6539 | 21.3017 | 7.1322 | 1.4536 | 0.4043 |
| XNOISE | 1.8121 | 2.4033 | 5.6173 | 15.0959 | 2.9692 | 2.1176 | 2.7761 | 3.7364 |
| YNOISE | 2.7612 | 2.1441 | 7.8466 | 15.5592 | 21.4064 | 7.3085 | 2.8516 | 3.8966 |

FIG. 10A

| INNER PRODUCT | LEVEL 0 | LEVEL 1 | LEVEL 2 | LEVEL 3 | LEVEL 4 | LEVEL 5 | LEVEL 7 | LEVEL 8 |
|---|---|---|---|---|---|---|---|---|
| X, Y | 4.0897 | 3.9874 | 41.9835 | 203.1391 | 24.9394 | 0.5206 | 0.0984 | 0.0223 |
| X, XNOISE | 2.3314 | 4.6545 | 31.0667 | 227.9521 | 7.1188 | 0.4673 | -0.0156 | 0.0043 |
| X, YNOISE | 4.0548 | 4.0986 | 43.0881 | 200.8837 | 25.4979 | 0.5104 | 0.1255 | 0.0266 |
| Y, XNOISE | 3.7903 | 4.6226 | 42.253 | 199.942 | 26.7305 | 1.9814 | -0.3967 | 0.0428 |
| Y, YNOISE | 7.7701 | 4.6308 | 59.5425 | 242.9634 | 457.4286 | 50.6845 | 1.6147 | 0.1749 |
| XNOISE, YNOISE | 4.1926 | 4.8239 | 43.1038 | 198.2702 | 27.503 | 2.3713 | -0.5344 | 0.8757 |

FIG. 10B

| ANGLE | LEVEL 0 | LEVEL 1 | LEVEL 2 | LEVEL 3 | LEVEL 4 | LEVEL 5 | LEVEL 7 | LEVEL 8 |
|---|---|---|---|---|---|---|---|---|
| X, Y | 0.2564 | 0.4212 | 0.1369 | 0.5411 | 1.104 | 1.4241 | 1.0138 | 0.4247 |
| X, XNOISE | 0.5139 | 0.2082 | 0.099 | 0.0727 | 0.3985 | 1.1132 | 1.6146 | 1.5518 |
| X, YNOISE | 0.1099 | 0.2627 | 0.1548 | 0.5496 | 1.0976 | 1.4305 | 1.2202 | 1.4579 |
| Y, XNOISE | 0.7511 | 0.5127 | 0.1649 | 0.5622 | 1.1345 | 1.4392 | 1.6693 | 1.5425 |
| Y, YNOISE | 0.1829 | 0.2078 | 0.0986 | 0.0701 | 0.0551 | 0.2357 | 1.1707 | 1.4595 |
| XNOISE, YNOISE | 0.5773 | 0.3592 | 0.2105 | 0.5659 | 1.1255 | 1.417 | 1.6384 | 1.5106 |

FIG. 10C

| DISTANCE | LEVEL 0 | LEVEL 1 | LEVEL 2 | LEVEL 3 | LEVEL 4 | LEVEL 5 | LEVEL 7 | LEVEL 8 |
|---|---|---|---|---|---|---|---|---|
| X, Y | 0.7527 | 0.9026 | 1.0405 | 8.0636 | 19.0224 | 7.0556 | 1.2339 | 0.1666 |
| X, XNOISE | 1.2051 | 0.6236 | 2.4783 | 8.321 | 20.4051 | 7.2372 | 2.8956 | 3.8892 |
| X, YNOISE | 1.4677 | 0.5707 | 2.2331 | 2.097 | 7.1585 | 1.9017 | 2.984 | 3.7538 |
| Y, XNOISE | 1.4786 | 0.4424 | 2.3954 | 2.9568 | 20.2536 | 7.0386 | 2.9686 | 3.8863 |
| Y, YNOISE | 1.861 | 1.789 | 2.4477 | 8.5029 | 20.3972 | 7.144 | 3.0898 | 3.7492 |
| XNOISE, YNOISE | 0.5106 | 0.396 | 2.0561 | 1.9619 | 6.2935 | 0.9978 | 2.9686 | 3.502 |

SHARING WAVELET DOMAIN COMPONENTS AMONG ENCODED SIGNALS

TECHNICAL FIELD OF THE INVENTION

This invention relates generally to wavelets and more particularly to sharing wavelet domain components among encoded signals.

BACKGROUND OF THE INVENTION

Wavelet analysis of a signal transforms the signal into a time-scale domain. The wavelet domain may produce different interpretations of a signal than other common transforms like the Fourier Transform or the Short-Time Fourier Transform. Wavelets have been used in applications for data analysis, data compression, and audio and video coding. Wavelets may be described using filter bank theory. A signal may be passed through a series of complementary low-pass and high-pass filters followed by decimators in a two-channel, analysis filter bank. At each stage in the filter bank, the input signal is broken down into two components: a low-pass, or coarse, part and a high-pass, or detailed, part. These two components are complimentary as a result of the way the filters are created. A Wavelet Transform further decomposes the coarse part from each iteration of the filter bank. A Wavelet Packet Transform provides the option of decomposing each branch of each stage. Many interesting decomposition structures may be formed using Wavelet packets.

Wavelet theory may also be described using Linear Algebra Theory. In the discrete-time case, an input signal can be described as an N-dimensional vector. If the input signal is infinite, the input vector is infinite. If the input signal is finite and is n samples long, the vector is n-dimensional. An N-dimensional vector lies in the Euclidean $\Re^N$ vector sub-space. A signal transform, such as a Fourier Transform or a Wavelet Transform, projects the input vector onto a different sub-space. The basis vectors of the new sub-space also form a basis for the original sub-space, $\Re^N$.

A Wavelet Transform includes two main elements: a high-pass filter followed by decimation, and a low-pass filter followed by decimation. These two operations can be thought of as two separate transforms. The high-pass channel projects the input vector onto a high-pass sub-space, and the low-pass channel projects the input vector onto a low-pass sub-space. The high-pass sub-space may be called the Wavelet Sub-Space, W, and the low-pass sub-space may be called the Scaling Sub-Space, V. The low-pass channel in the filter bank can be iterated numerous times, creating many levels in the transform. With each iteration, the input vector is projected onto another Wavelet and Scaling Sub-Space. The Wavelet Sub-Space at level j may be labeled as $W_j$, and the Scaling Sub-Space at level j may be labeled as $V_j$.

Wavelet Packet Transforms allow any channel to be iterated further. With each iteration, the input vector is being projected onto another Wavelet and Scaling Sub-Space. A Wavelet Packet Tree decomposition requires a slightly different naming convention for the various sub-spaces. A node in the tree structure may be described by its depth i and position j. The Wavelet Sub-Space at depth i and position j may be labeled as $W_{i,j}$, and the Scaling Sub-Space may be labeled as $V_{i,j}$. It may also be noted that for the Wavelet Packet Transform, the Wavelet Sub-Space may only be located at odd j positions (with numbering beginning at zero) and the Scaling Sub-Space may only be located at even j positions.

SUMMARY OF THE INVENTION

Particular embodiments of the present invention may reduce or eliminate disadvantages and problems traditionally associated with compressing and decompressing encoded signals.

In one embodiment of the present invention, a system for sharing wavelet domain components among encoded signals receives a set of signals decomposed and encoded according to a wavelet transform or a Wavelet Packet Transform. The decomposed and encoded signals each include a set of wavelet coefficients at each level of the decomposition of the encoded signal. Using a vector quantization technique, the system identifies one or more sets of wavelet coefficients that are sharable among two or more of the decomposed and encoded signals at a particular level of decomposition. The system then stores the sets of wavelet coefficients of the decomposed and encoded signals. Each identified sharable set of wavelet coefficients at a particular level of decomposition is stored only once and shared by two or more of the decomposed and encoded signals.

Particular embodiments of the present invention may provide one or more technical advantages. In particular embodiments, a set of audio signals may be compressed to ease memory constraints while, at the same time, maintaining perceptual integrity and real-time performance for music or voice synthesis and similar applications. In particular embodiments, wavelets, psychoacoustic modeling, and possibly other techniques may be used to compress PCM signal data. Particular embodiments may be used to compress sets of Wavetable samples.

Certain embodiments may provide all, some, or none of these technical advantages, and certain embodiments may provide one or more other technical advantages which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 1 illustrates example compression of a data set according to a vector quantization technique;

FIG. 2 illustrates example data elements that have been projected onto a Wavelet Sub-Space or Scaling Sub-Space;

FIGS. 3A and 3B illustrate example plots of signals;

FIG. 9 illustrates example norms of signals at various decomposition levels;

FIGS. 10A, 10B, and 10C illustrate example inner products, angles, and distances of various signals;

DESCRIPTION OF EXAMPLE EMBODIMENTS

Figure 4A:
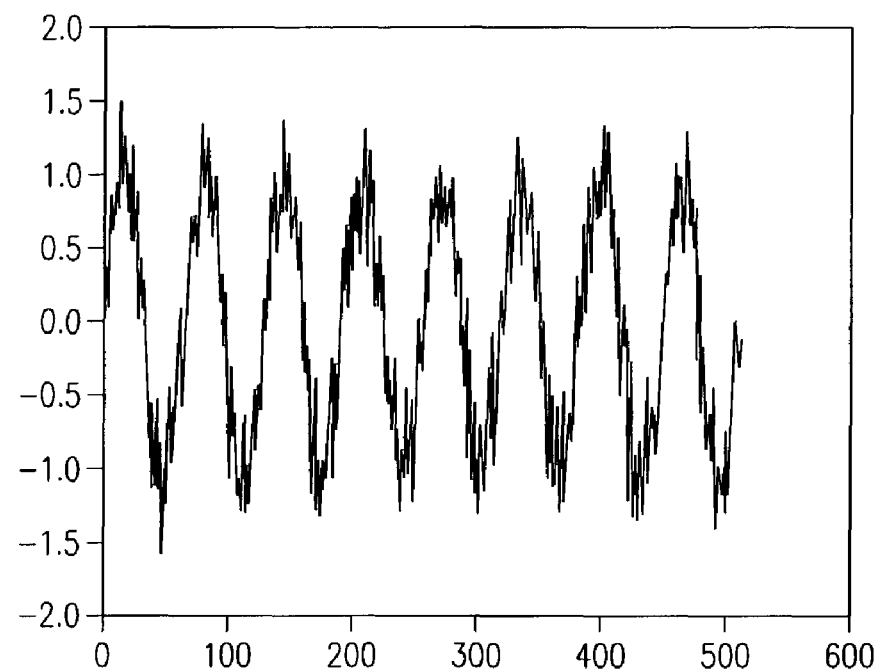
FIGS. 4A and 4B illustrate example plots of noisy signals.

Wavelet theory may be described using Linear Algebra Theory. In the discrete-time case, an input signal can be described as an N-dimensional vector. An N-dimensional vector lies in the $\Re^N$ vector sub-space. A signal transform, such as a Fourier Transform or a Wavelet Transform, projects the input vector onto a different sub-space. The basis vectors of the new sub-space also form a basis for the original sub-space, $\Re^N$.

A Wavelet Transform includes two main elements: a high-pass filter followed by decimation, and a low-pass filter followed by decimation. These two operations can be thought of as two separate transforms. The high-pass channel projects the input vector onto a high-pass sub-space, and the low-pass channel projects the input vector onto a low-pass sub-space. The high-pass sub-space may be called the Wavelet Sub-Space, W, and the low-pass sub-space may be called the Scaling Sub-Space, V. The union of the sub-spaces is the original Euclidean $\Re^N$ sub-space. The low-pass channel in the filter bank can be iterated numerous times, creating many levels in the transform. With each iteration, the input vector is projected onto another Wavelet and Scaling Sub-Space. The Wavelet Sub-Space at level j may be labeled as $W_j$, and the Scaling Sub-Space at level j may be labeled as $V_j$.

Wavelet Packet Transforms allow any channel to be iterated further. With each iteration, the input vector is being projected onto another Wavelet and Scaling Sub-Space. A Wavelet Tree decomposition requires a slightly different naming convention for the various sub-spaces. A node in the tree structure may be described by its depth i and position j. The Wavelet Sub-Space at depth i and position j may be labeled as $W_{i,j}$, and the Scaling Sub-Space may be labeled as $V_{i,j}$. It may also be noted that for the Wavelet Packet Transform, the Wavelet Sub-Space may only be located at odd j positions (with numbering beginning at zero) and the Scaling Sub-Space may only be located at even j positions.

A data set may be transformed into the wavelet domain using a wavelet Transform or a Wavelet Packet Transform. Every element of the data set is transformed into the wavelet domain. The elements of the data set may contain scalar information or vector information. In particular embodiments, the transformed data set may be further processed according to various compression techniques and other signal modifications. After the data set has been transformed into the wavelet domain, the data set may be compressed by applying a type of vector quantization technique to the wavelet domain coefficients, as illustrated in FIG. 1. Each element, $X_i$, in data set is transformed into the Wavelet domain via a Wavelet Transform or a Wavelet Packet Transform. Elements transformed via a Wavelet Packet Transform need not have the same decomposition structure. Each element $WT_i$ (meaning Wavelet-Tree structure i) in Wavelet domain data set consists of $Nband_i$ levels with each level containing sets of wavelet domain coefficients corresponding to $W_{i,j}$ and $V_{i,j}$. The dimensions of the wavelet domain coefficients at each level of element $W_i$ depends on the size of $X_i$. Optional processing may include compression or any other operation that modifies the elements in Wavelet domain data set. Different data elements that have been projected onto a certain Wavelet Sub-Space or Scaling Sub-Space may be similar enough that only one representation can be used for the similar data elements, as illustrated in FIG. 2. Similarity measures may include vector norms, projections, distance measures, and other correlation measures. For certain applications (such as audio sample set coding), the similarity measures may also include one or more psychoacoustic measures.

Figure 4B:
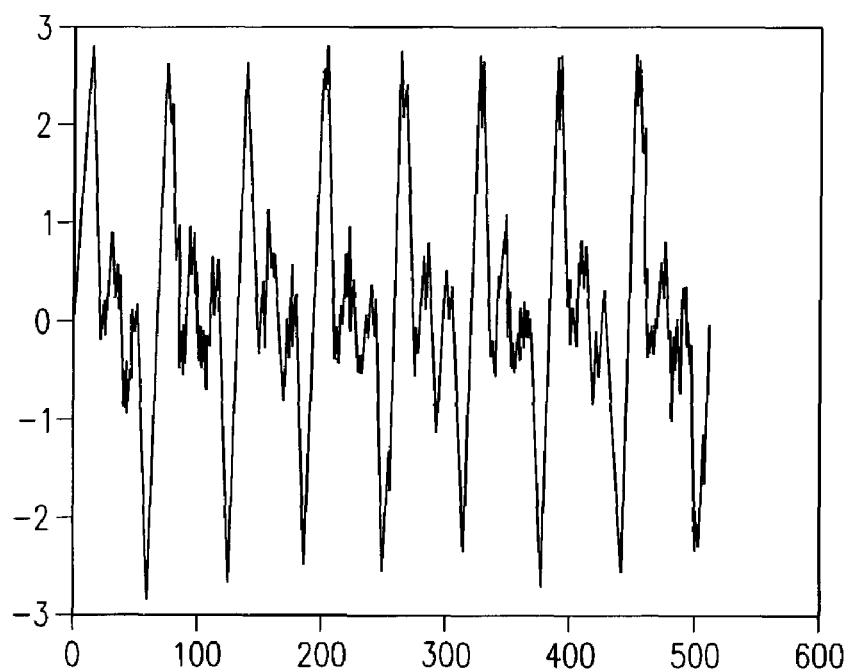

In particular embodiments, the notion of the subspaces $W_{i,j}$ and $V_{i,j}$, are central to the "sharing" algorithm. The projection of a signal onto one of the sub-spaces may reveal a certain quality of that signal that was not as visible in its original domain. Examining two signals using only their projections on the wavelet sub-spaces may reveal more information than trying to compare the signals in their original form. An example illustrates this idea. Let $x=\sin(\omega_o n)$ for $n\in[0,16\pi]$ with intervals of $\pi/32$ (five hundred thirteen samples), and let $y=\sin(\omega_o n)+\sin(2\omega_o n)+\sin(3\omega_o n)$. FIG. 3A illustrates an example plot of x, and FIG. 3B illustrates an example plot of y. A noise vector $r_i$ may be added to x and y (noise vector may be created using the "randn" function in MATLAB), and xnoise=x+$r_1$ and ynoise=y+$r_2$. FIGS. 4A and 4B illustrates example plots of the noisy signals. FIG. 4A illustrates $r_1$ added to x, and FIG. 4B illustrates $r_2$ added to y.

Examining FIGS. 3A, 3B, 4A, and 4B in the time domain, one may conclude that both signals have roughly the same period, but, beyond that, results are not entirely obvious. Fourier analysis of these signals may provide useful information, pointing out that both signals share a common fundamental frequency. However, a wavelet analysis of these signals may show other results. In this example, the Daubechies 6-tap (db3) wavelet was used to decompose these signals. The signals are five hundred thirteen samples long. The signals were decomposed using a 7-level Wavelet Transform.

Figure 5:
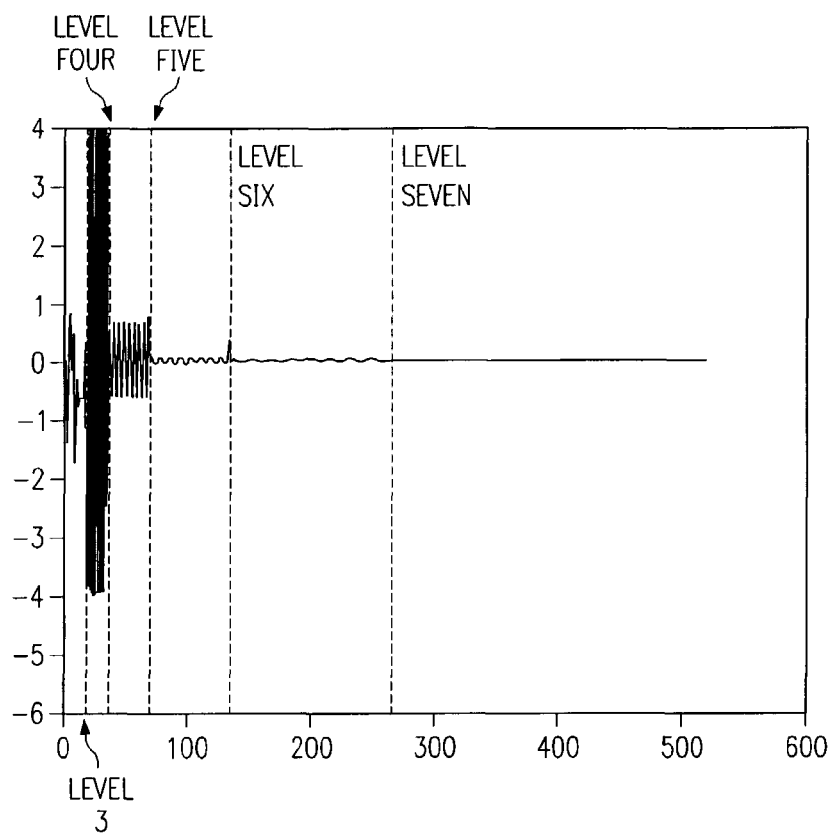
FIG. 5 illustrates example wavelet coefficients of a signal.
Figure 6:
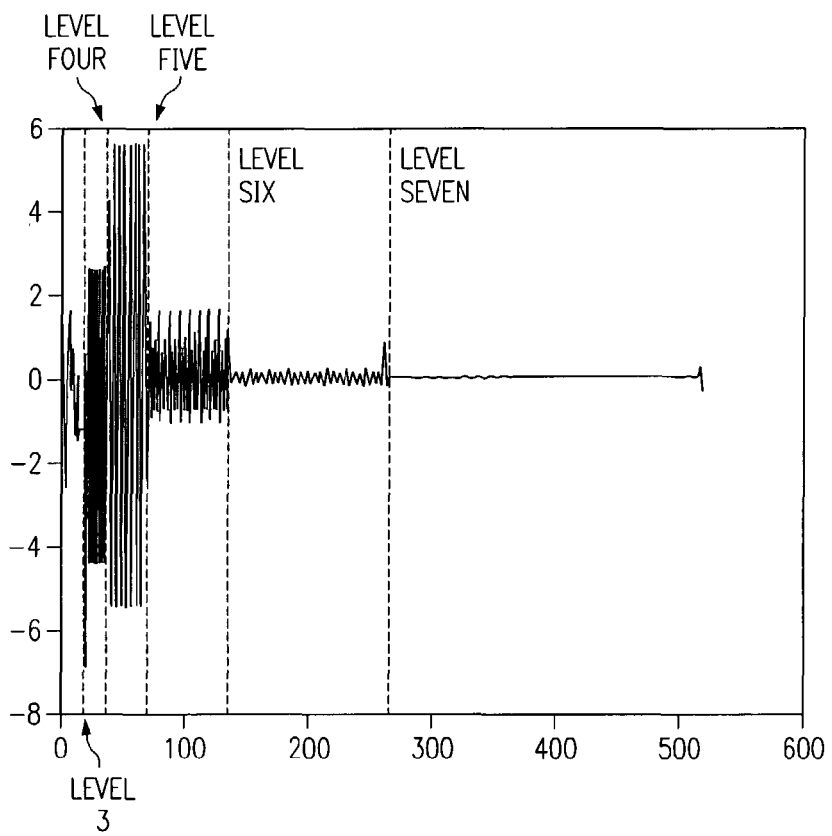
FIG. 6 illustrates example wavelet coefficients of another signal.
Figure 7:
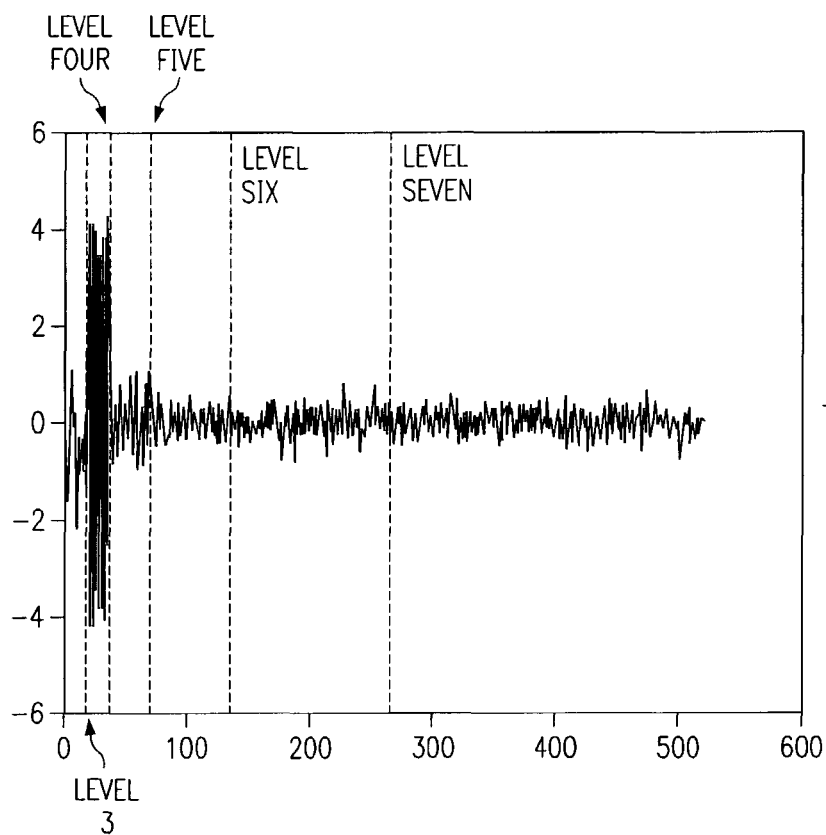
FIG. 7 illustrates example wavelet coefficients of a noisy signal.
Figure 8:
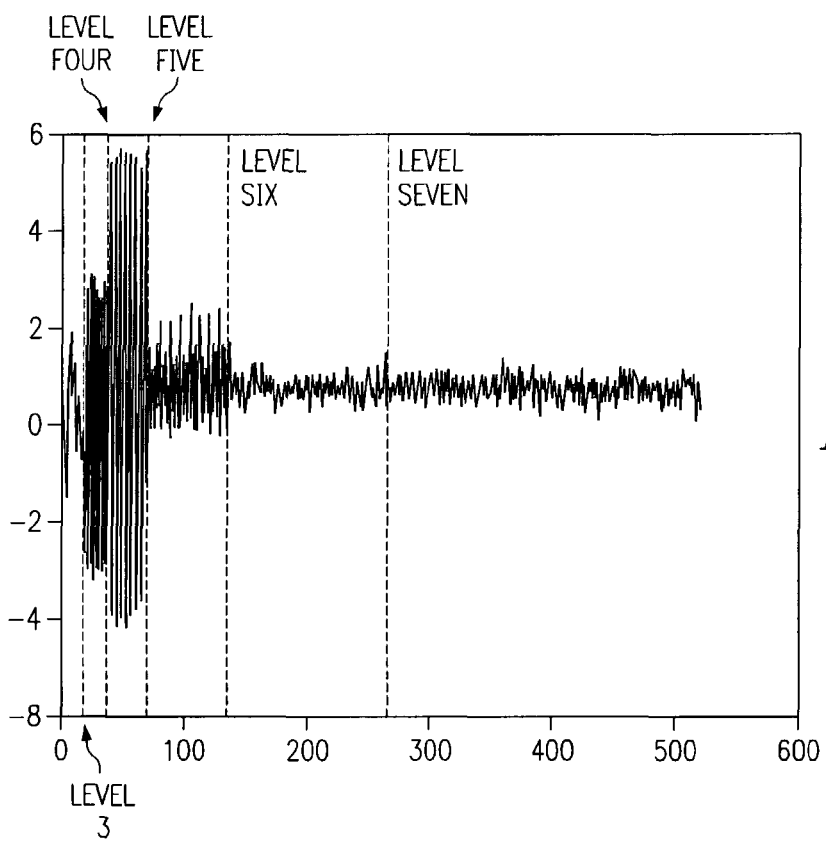
FIG. 8 illustrates example wavelet coefficients of another noisy signal.

FIG. 5 illustrates the wavelet coefficients for x. FIG. 6 illustrates the wavelet coefficients for y. FIG. 7 illustrates the wavelet coefficients for xnoise. FIG. 8 illustrates the wavelet coefficients for ynoise. FIGS. 5-8 illustrate the wavelet coefficients for each of the signals with the coefficients from each level concatenated to form one vector. It may be desirable to store these four signals efficiently. Each signal has five hundred thirteen coefficients in the time domain, and five hundred twenty wavelet domain coefficients. There are more wavelet domain coefficients because a signal extension technique was used during the transformation. If lossy compression is acceptable, sharing coefficients at certain levels may result in significant storage space reduction. Quantitative measures for determining which coefficients may be shared are described more fully below.

Coefficients from two signals at the same decomposition level that are highly correlated may be good candidates for sharing. However, finding a suitable measure for determining the correlation of a set of coefficients may be difficult. Standard correlation functions are based on the convolution function and may be used, but may not provide substantially intuitive and concise results. Vector projections and inner products, however, may provide more intuitive and concise measures. To explain the methodology, suppose there are two vectors $X, y \in \Re^N$ with equal norms (for simplicity the norms may be equal to 1), $\|x\|_2 = \|y\|_2 = 1$. The inner product of these vectors, $<x,y>=\|x\|_2 \|y\|_2 \cos\theta_{xy}$, is a function of each vectors magnitude and the angle between them. Since both vectors have unit magnitude, the only substantial difference between them is the angle. Even though these are N-dimensional vectors, they may be visualized as both lying on a ball with radius one. A vector within a three-dimensional ball can be represented by the spherical coordinates [r, φ, θ]. Likewise, an N-dimensional ball can be represented by its radius and N−1 angles. The larger N is, the greater the likelihood that the two random vectors in that sub-space will be linearly independent of each other, since there are more degrees of freedom. If the vectors are perfectly aligned, then $<x,y>=\|x\|_2^2=\|y\|_2^2=\|x\|_2\|y\|_2$, and it may be concluded that x=y.

Vectors of the same dimension that may be linearly independent of each other may be rotated using a rotation matrix to align the vectors. The vectors may also be thought of as one period of an infinite periodic signal. With that interpretation, a phase shift may also be applied to the vector to achieve alignment. More generally, vectors of the same dimension that have an angle between them that is greater than 0 may be rotated or phase-shifted to reduce that angle bringing them closer together. Therefore, it may be insufficient to take the inner product of only x and y. The inner product between x and rotated versions and phase-shifted versions of y should be considered. One way to accomplish the phase-shift may be to create a circulant matrix, from one of the vectors, which may be described as follows:

$$x = \begin{bmatrix} x_1 \\ x_2 \\ \vdots \\ x_N \end{bmatrix} \quad (1)$$

$$X_{cir} = \begin{bmatrix} x_1 & x_2 & \cdots & x_N \\ x_N & x_1 & \cdots & x_{N-1} \\ \vdots & \vdots & \cdots & \vdots \\ x_2 & x_3 & \cdots & x_1 \end{bmatrix} \quad (2)$$

$$X_{cir}y = \begin{bmatrix} \langle x_{shift0}, y \rangle \\ \langle x_{shift1}, y \rangle \\ \vdots \\ \langle x_{shift(N-1)}, y \rangle \end{bmatrix} \quad (3)$$

The circulant matrix is formed by creating N phase-shifts of the original vector.

The inner product operation may now become a matrix-vector multiplication, with each entry in the output vector being the inner product between the vector y and a permutated version of x.

A related measure to the inner product is the distance between two vectors. The distance may be found by calculating the projection of one vector onto the other. The error vector, or the difference between the projection and the projected vector, represents the distance. The projection, p, of y onto x is defined below. The error and distance equations are also shown below.

$$p = \frac{\langle x, y \rangle}{\|x\|_2^2} x \quad (4)$$

$$err = y - p \quad (5)$$

$$distance = \|err\|_2 \quad (6)$$

As before, the inner product portion of the distance measure may use the entries from the circulant matrix output in equation (3). In the case where $\|x\|_2=\|y\|_2$, the distance metric may not give much more information than the inner product defined earlier, since projection is based on the inner product. However, these metrics may provide a suitable way of judging how "close" two vectors are to each other.

To further generalize these measures, the case where $\|x\|_2 \neq \|y\|_2$ may be examined. The mathematics in this case may not change, but the interpretation of the measures described above may need to be modified. In this situation, the vectors x and y, although both in the same sub-space, lie on balls of different diameters. In addition to the distance and inner product measures, the norm of the vectors may also become a useful measure. These measures may be inherently related, but the weight each one has on its own is what makes them significant. For example, if $\|x\|_2 \gg \|y\|_2$, the distance between the two vectors might still be very small. In this situation, the angle between the two vectors and the vector norms may have more weight. These measures may be interesting when applied to each of the sub-spaces generated from the Wavelet Transform. At each level, the dimension of the sub-space may be approximately halved. Furthermore, each sub-space may extract a part of the original signal that may not exist in any other sub-space. By examining these measures at each wavelet sub-space, a correlation may be found more readily than by examining the signals in their original domain or in the Fourier domain.

The vectors in the original example are five hundred thirteen samples long. Each sample has a different norm and consequently lie on balls of different radii. The coefficients for each of the levels may be denoted as follows: $\tilde{x}_i$, for i= 1, 2, ..., N, where N is the number of levels and i indexes each level. $\tilde{x}_0$ is the approximation level coefficient vector. Since the signals in the example are periodic, the wavelet coefficients may be redundant. FIG. 9 illustrates norms of signals at various decomposition levels. FIGS. 10A, 10B, and 10C illustrate the inner product, angle, and distance of various signals. As described above, the inner product, angle, and distance are useful measures. These measures were calculated for each of the signals. Phase shifts and rotations were not applied during these calculations.

Figure 11:
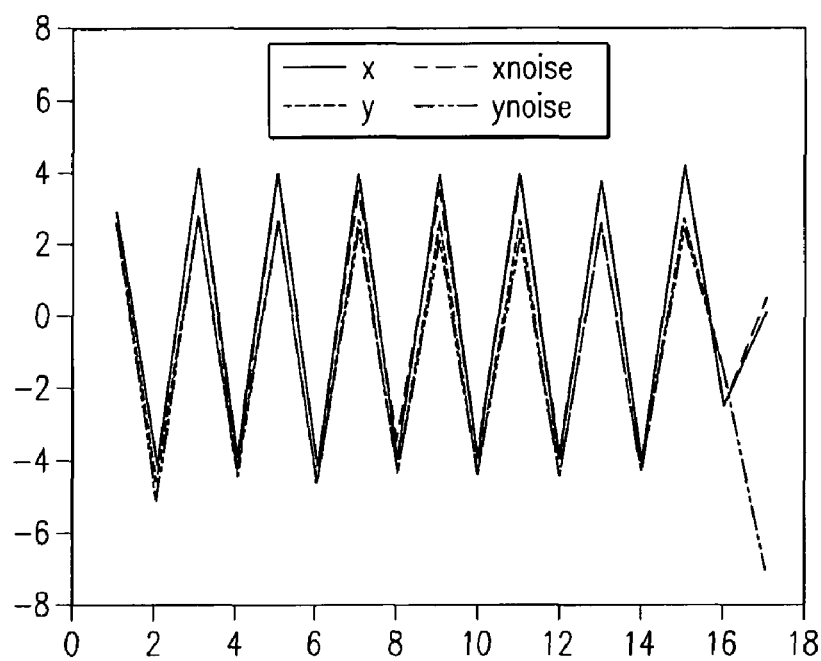
FIG. 11 illustrates example level-three coefficients of signals.
Figure 12:
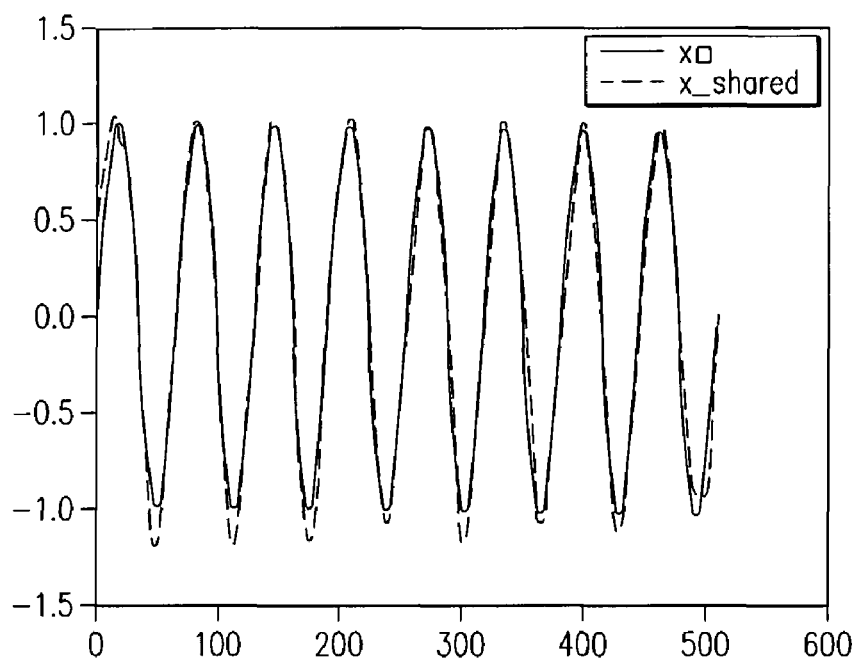
FIG. 12 illustrates example signals reconstructed using shared coefficients.
Figure 13:
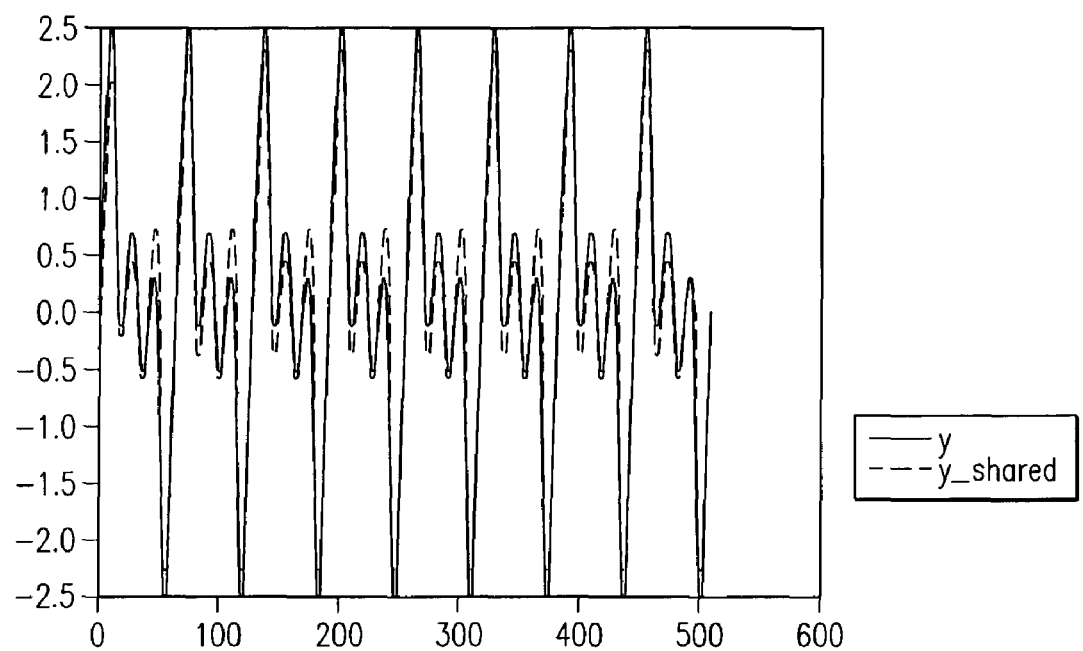
FIG. 13 illustrates other example signals reconstructed using shared coefficients.
Figure 14:
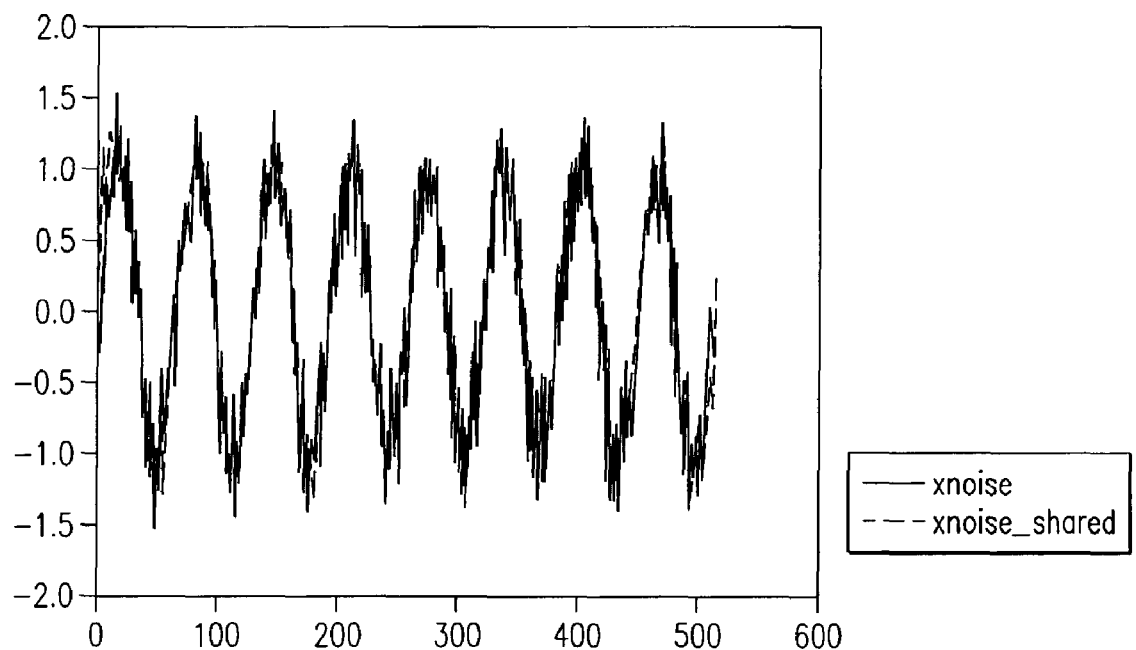
FIG. 14 illustrates example noisy signals reconstructed using shared coefficients.
Figure 15:
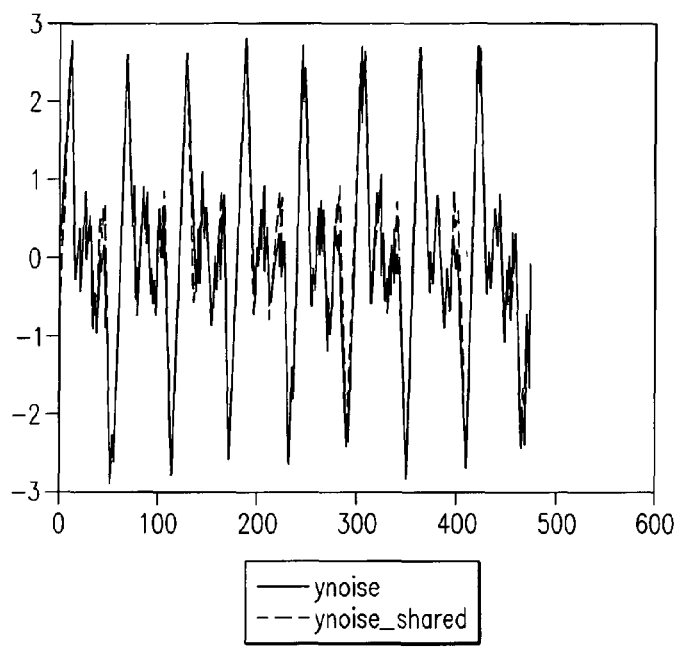
FIG. 15 illustrates other example noisy signals reconstructed using shared coefficients.

For this example, the tables and the figures show that coefficients at level three for all the signals seem correlated. FIG. 11 illustrates the level-three coefficients for x, y, xnoise, and ynoise. One set of coefficients may be stored instead of four sets. In this example, the average of the four level-three coefficients is stored along with a scale factor to adjust the amplitude. Other coefficients that may be shared include the level-four coefficients between x and xnoise, the level-four and level-three coefficients between y and ynoise, and the level-two and level-one coefficients of xnoise and ynoise. FIG. 12 illustrates the original x and a new version of x reconstructed using the shared coefficients described above. FIG. 13 illustrates the original y and a new version of y reconstructed using the shared coefficients described above. FIG. 14 illustrates the original xnoise and a new version of xnoise reconstructed using the shared coefficients described above. FIG. 15 illustrates the original ynoise and a new version of ynoise reconstructed using the shared coefficients described above. Storing the original coefficients requires storing 4*520=2080 samples. With the sharing scheme described above, only one-thousand five hundred twelve samples need to be stored. This corresponds to approximately twenty-seven percent fewer samples that need to be stored. The reconstructed samples may be degraded versions of the original, but more sophisticated techniques for sharing coefficients may improve the signal. Furthermore, the example did not employ the more sophisticated similarity measures described above.

In this example, the compression factor is not substantially large, but no other compression techniques were applied. The sharing algorithm does not exclude the possibility of further compressing the signal using standard techniques, which may ultimately create better compression. Thus, sharing wavelet coefficients is a practical option for sound compression. In this example, no weight was given to the wavelet used. The db3 wavelet was arbitrarily chosen. The results of the techniques described above can be substantially improved by searching over the space of wavelets to find the wavelet that yields the best results for this method. The best wavelet for this method may also depend on the class or type of data set used. Furthermore, various applications may dictate different type of sharing measures than those described above. One example may include the wavelet domain signals having been generated from an audio sample set. In this case, psychoacoustic measures may be used to determine which levels may be shared between various levels.

Figure 16:
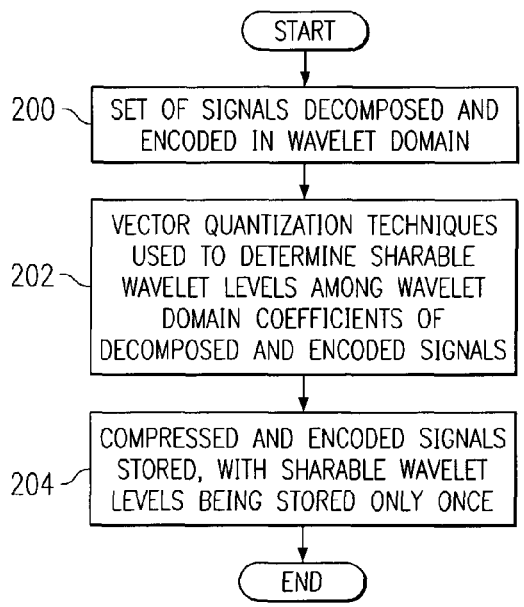
FIG. 16 illustrates an example method for sharing wavelet domain components among encoded signals.

FIG. 16 illustrates an example method for sharing wavelet domain components among encoded signals. The method begins at step 200, where a set of signals is decomposed and encoded in the wavelet domain. In particular embodiments, the set of signals may include a Wavetable sample set. The wavelet domain coefficients may then be quantized using a bit-allocation scheme based on a psychoacoustic model to achieve compression. At step 202, vector quantization techniques are used to determine which wavelet levels may be shared among the wavelet domain coefficients of the signals. At step 204, the compressed and encoded signals are stored, with the sharable wavelet levels among the wavelet domain coefficients of the signals being stored only once, at which point the method ends. When a signal is subsequently requested and the requested signal, as stored, shares one or more wavelet coefficients with one or more other signals in the set of signals, those shared wavelet coefficients and other wavelet components of the requested signal that are unique to the requested signal may be used to decode the requested signal.

Although several embodiments of the present invention have been described, the present invention may encompass sundry changes, substitutions, variations, alterations, and modifications, and it is intended that the present invention encompass all those changes, substitutions, variations, alterations, and modifications falling within the spirit and scope of the appended claims.

What is claimed is:

1. A system for sharing wavelet domain components among encoded signals, the system operable to:
receive a set of a plurality of concurrent, time-varying signals, each of said plurality of concurrent, time-varying signals decomposed and encoded according to a wavelet transform in a plurality of iterations, each iteration consisting of a low-pass filter followed by decimation and a high-pass filter followed by decimation forming a corresponding level of decomposition, each of the plurality of decomposed and encoded signals comprising a set of wavelet coefficients at each level of the decomposition of the encoded signal;
using a vector quantization technique, identify one or more sets of wavelet coefficients that are sharable among two or more of the plurality of decomposed and encoded signals at a particular level of decomposition of the plurality of concurrent, time-varying signals; and
store the sets of wavelet coefficients of the plurality of decomposed and encoded signals of the plurality of concurrent, time-varying signals, each identified sharable set of wavelet coefficients at a particular level of decomposition being stored only once and shared by two or more of the plurality of decomposed and encoded signals of the plurality of concurrent, time-varying signals.

2. The system of claim 1, wherein at least one measure used to identify a sharable set of wavelet coefficients according to the vector quantization technique comprises a distance separating two or more vectors.

3. The system of claim 1, wherein at least one measure used to identify a sharable set of wavelet coefficients according to the vector quantization technique comprises a vector norm.

4. The system of claim 1, wherein one or more psychoacoustic measures are used in addition to the vector quantization technique to identify the one or more sharable sets of wavelet coefficients.

5. A method for sharing wavelet domain components among encoded signals, the method comprising:
receiving a set of a plurality of concurrent, time-varying signals, each of said plurality of concurrent, time-varying signals decomposed and encoded according to a wavelet transform in a plurality of iterations, each iteration consisting of a low-pass filter followed by decimation and a high-pass filter followed by decimation forming a corresponding level of decomposition, each of the plurality of decomposed and encoded signals comprising a set of wavelet coefficients at each level of the decomposition of the encoded signal;
using a vector quantization technique, identify one or more sets of wavelet coefficients that are sharable among two or more of the plurality of decomposed and encoded signals of the plurality of concurrent, time-varying signals at a particular level of decomposition; and
storing the sets of wavelet coefficients of the plurality of decomposed and encoded signals, each identified sharable set of wavelet coefficients at a particular level of decomposition being stored only once and shared by two or more of the plurality of decomposed and encoded signals of the plurality of concurrent, time-varying signals.

6. The method of claim 5, wherein at least one measure used to identify a sharable set of wavelet coefficients according to the vector quantization technique comprises a distance separating two or more vectors.

7. The method of claim 5, wherein at least one measure used to identify a sharable set of wavelet coefficients according to the vector quantization technique comprises a vector norm.

8. The method of claim 5, wherein one or more psychoacoustic measures are used in addition to the vector quantization technique to identify the one or more sharable sets of wavelet coefficients.

9. A system for sharing wavelet domain components among encoded audio signals, the system operable to:
receive a set of a plurality of concurrent, time-varying audio signals, each of said plurality of audio signals decomposed and encoded according to a wavelet transform in a plurality of iterations, each iteration consisting of a low-pass filter followed by decimation and a high-pass filter followed by decimation forming a corresponding level of decomposition, each of the plurality of decomposed and encoded audio signals comprising a set of wavelet coefficients at each level of the decomposition of the encoded signal, one or more of the plurality of audio signals having each been decomposed and encoded using one or more wavelets that are substantially optimal for the audio signal, the one or more substantially optimal wavelets having been selected from a space of wavelets;

using a vector quantization technique and one or more psychoacoustic measures, identify one or more sets of wavelet coefficients that are sharable among two or more of the plurality of decomposed and encoded audio signals of the plurality of concurrent, time-varying signals at a particular level of decomposition; and store the sets of wavelet coefficients of the plurality of decomposed and encoded audio signals, each identified sharable set of wavelet coefficients at a particular level of decomposition being stored only once and shared by two or more of the plurality of decomposed and encoded audio signals of the plurality of concurrent, time-varying signals.

10. A method for sharing wavelet domain components among encoded audio signals, the method comprising:

receiving a set of a plurality of concurrent, time-varying audio signals, each of said plurality of audio signals decomposed and encoded according to a wavelet transform in a plurality of iterations, each iteration consisting of a low-pass filter followed by decimation and a high-pass filter followed by decimation forming a corresponding level of decomposition, each of plurality of the decomposed and encoded audio signals of the plurality of concurrent, time-varying signals comprising a set of wavelet coefficients at each level of the decomposition of the encoded signal, one or more of the audio signals having each been decomposed and encoded using one or more wavelets that are substantially optimal for the audio signal, the one or more substantially optimal wavelets having been selected from a space of wavelets;

using a vector quantization technique and one or more psychoacoustic measures, identifying one or more sets of wavelet coefficients that are sharable among two or more of the plurality of decomposed and encoded audio signals of the plurality of concurrent, time-varying signals at a particular level of decomposition; and storing the sets of wavelet coefficients of the plurality of decomposed and encoded audio signals of the plurality of concurrent, time-varying signals, each identified sharable set of wavelet coefficients at a particular level of decomposition being stored only once and shared by two or more of the plurality of decomposed and encoded audio signals of the plurality of concurrent, time-varying signals.

* * * * *